United States Patent
Bichkar et al.

(10) Patent No.: US 11,970,153 B2
(45) Date of Patent: Apr. 30, 2024

(54) SYSTEM AND METHOD FOR LEARNING DRIVELINE DISCONNECT CLUTCH LIFTOFF

(71) Applicant: Ford Global Technologies, LLC, Dearborn, MI (US)

(72) Inventors: Akshay Bichkar, Ann Arbor, MI (US); Corey James Blue, Belleville, MI (US); Samuel Melville Glauber, Northville, MI (US); Joseph Kucharski, Livonia, MI (US); Bradley Dean Riedle, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/823,812

(22) Filed: Aug. 31, 2022

(65) Prior Publication Data

US 2024/0067159 A1 Feb. 29, 2024

(51) Int. Cl.
*B60W 10/02* (2006.01)
*B60W 20/40* (2016.01)
*F16D 25/00* (2006.01)
*F16D 48/02* (2006.01)

(52) U.S. Cl.
CPC .......... *B60W 20/40* (2013.01); *B60W 10/026* (2013.01); *F16D 25/14* (2013.01); *F16D 48/02* (2013.01); *B60W 2510/0233* (2013.01); *B60W 2710/024* (2013.01)

(58) Field of Classification Search
CPC .............. B60W 20/40; B60W 10/026; B60W 2510/0233; B60W 2710/024; F16D 25/14; F16D 48/02; F16D 2500/3024; F16D 2500/3026
See application file for complete search history.

(56) References Cited

U.S. PATENT DOCUMENTS

| | | | |
|---|---|---|---|
| 9,028,363 B2 | 5/2015 | Kobayashi et al. | |
| 9,527,505 B1 | 12/2016 | Gibson et al. | |
| 9,545,908 B2 | 1/2017 | Doering et al. | |
| 11,041,533 B1 | 6/2021 | Hommes et al. | |

(Continued)

FOREIGN PATENT DOCUMENTS

| | | | | |
|---|---|---|---|---|
| EP | 3805061 A1 | 4/2021 | | |
| JP | 2007333129 A | * 12/2007 | ............. | F16H 3/006 |
| JP | 2009001172 A | * 1/2009 | ............. | B60W 10/02 |

OTHER PUBLICATIONS

Machine translation of JP2009001172A filed Oct. 6, 2023, 6 pages. (Year: 2023).*

(Continued)

*Primary Examiner* — Tisha D Lewis
(74) *Attorney, Agent, or Firm* — David Kelley; McCoy Russell LLP

(57) ABSTRACT

Systems and methods for operating a driveline disconnect clutch of a hybrid vehicle are presented. In one example, a driveline disconnect clutch liftoff pressure is estimated according to a derivative of a driveline disconnect clutch pressure when a driveline disconnect clutch is being de-stroked. The driveline disconnect clutch may be preposi-tioned in anticipation of driveline disconnect closing based on the estimated driveline disconnect clutch liftoff pressure.

14 Claims, 5 Drawing Sheets

(56) References Cited

U.S. PATENT DOCUMENTS

| | | | |
|---|---|---|---|
| 11,661,052 B1* | 5/2023 | Bichkar | B60W 10/023 701/67 |
| 2003/0045988 A1* | 3/2003 | Suzuki | B60W 20/00 903/945 |
| 2010/0174460 A1* | 7/2010 | Gibson | B60W 10/026 701/112 |
| 2021/0086775 A1* | 3/2021 | Blue | B60W 10/08 |
| 2022/0025942 A1 | 1/2022 | Enders | |

OTHER PUBLICATIONS

Bichkar, A. et al., "System and Method for Driveline Disconnect Clutch De-Stroking and Prepositioning," U.S. Appl. No. 17/823,894, filed Aug. 31, 2022, 39 pages.

* cited by examiner

SYSTEM AND METHOD FOR LEARNING DRIVELINE DISCONNECT CLUTCH LIFTOFF

FIELD

The present description relates to methods and a system for operating a driveline disconnect clutch of a hybrid vehicle.

BACKGROUND AND SUMMARY

A driveline disconnect clutch may be selectively opened and closed to conserve fuel and reduce emissions. The driveline disconnect clutch allows an electric machine to propel a vehicle without having to rotate an internal combustion engine. The driveline disconnect may also be used to start the internal combustion engine via transferring torque from the electric machine to the engine. However, torque transfer through the driveline disconnect clutch may be inconsistent if the driveline disconnect clutch is closed from different starting positions. Further, it may take longer than is desired to start the engine via closing the driveline disconnect clutch during some conditions. Inconsistent torque delivery and engine starting delays may be exacerbated by driveline disconnect clutch wear and piece to piece variability. Therefore, it may be desirable to provide a way of reducing engine starting delays and improving torque delivery consistency.

The inventors herein have recognized the above-mentioned issue and have developed a method for operating a vehicle, comprising: via one or more controllers, during de-stroking of a driveline disconnect clutch, monitoring a driveline disconnect clutch pressure and generating an estimated driveline disconnect clutch liftoff pressure via the driveline disconnect clutch pressure; and adjusting a commanded driveline disconnect clutch pressure based on the estimated driveline disconnect clutch liftoff pressure.

By determining a driveline disconnect clutch liftoff pressure during de-stroking of a driveline disconnect clutch, it may be possible to determine a preposition for a driveline disconnect clutch without disturbing driveline disconnect clutch operation. The preposition may be a driveline disconnect clutch position where it takes little time to engage the driveline disconnect clutch and where drag of the driveline disconnect clutch begins to increase as driveline disconnect clutch pressure is increased.

The present description may provide several advantages. In particular, the approach may learn a driveline disconnect clutch preposition without affecting driveline operation. Further, the approach may improve vehicle drivability. Additionally, the approach may reduce the possibility of driveline torque disturbances.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to improving operation of a driveline disconnect clutch of a hybrid vehicle. In particular, a liftoff pressure, a pressure where driveline disconnect clutch drag begins to increase from a constant steady-state value as pressure within the driveline disconnect clutch increases, may be determined during de-stroking of a driveline disconnect clutch. The liftoff pressure may be subsequently applied in preparation for closing of the driveline disconnect clutch to reduce an amount of time it takes to close the driveline disconnect clutch. Further, the liftoff pressure may preposition the driveline disconnect clutch at a position where the driveline disconnect clutch may be closed with repeatable torque capacity and closing profile, thereby improving vehicle drivability.

Figure 1:
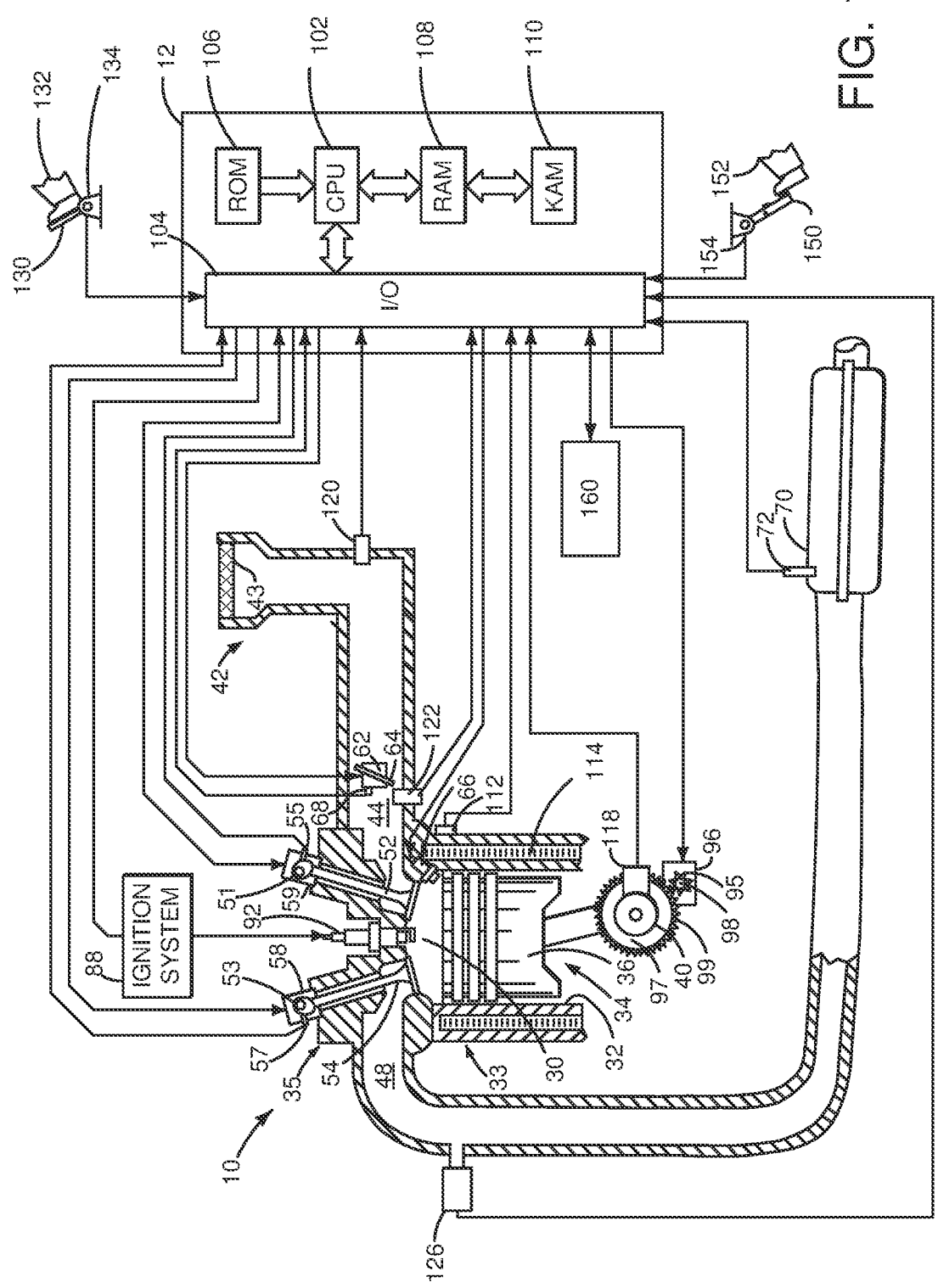
FIG. 1 is a schematic diagram of an engine.
Figure 2:
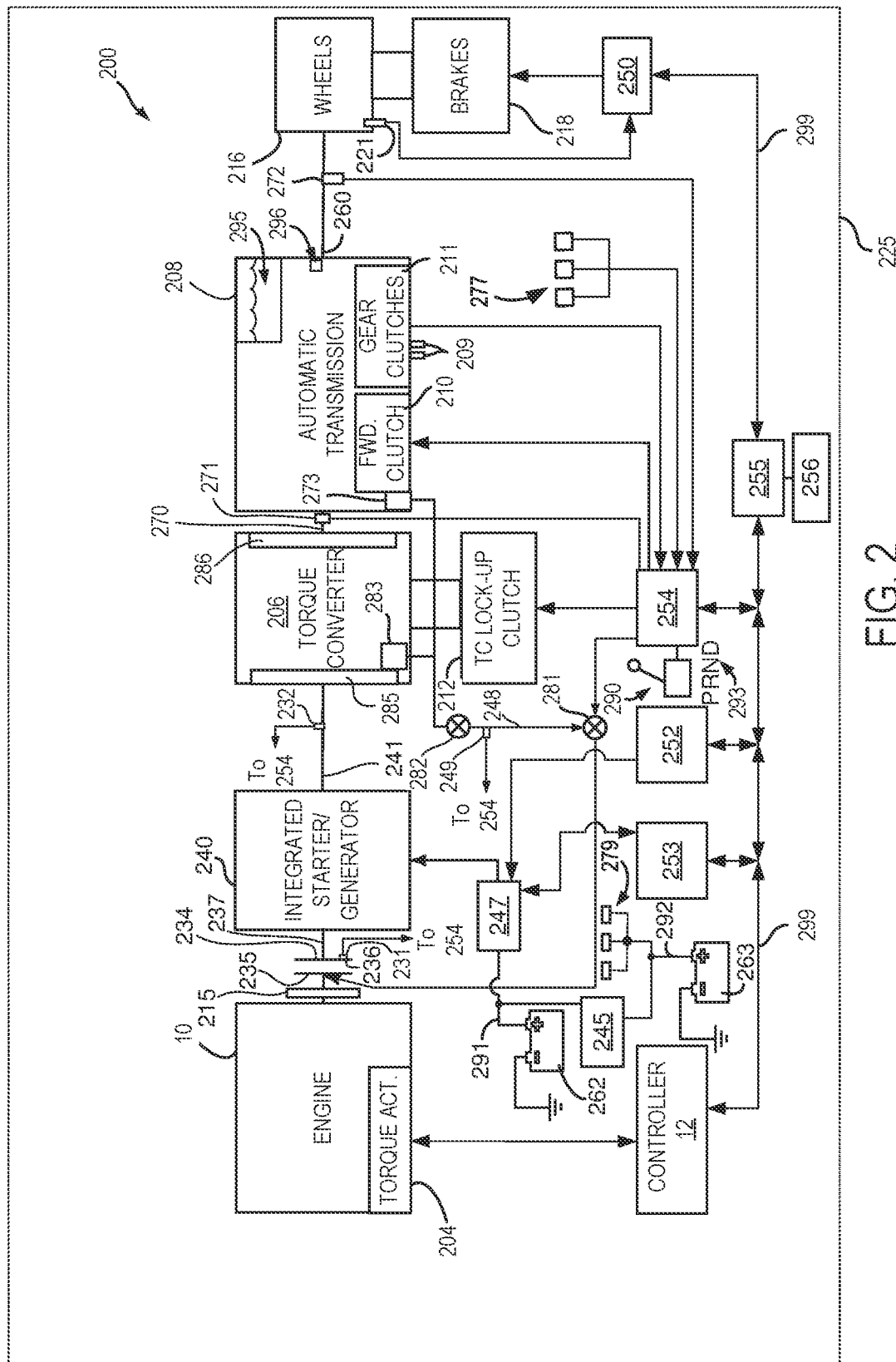
FIG. 2 is a schematic diagram of a hybrid vehicle driveline including the engine of FIG. 1.
Figure 3:
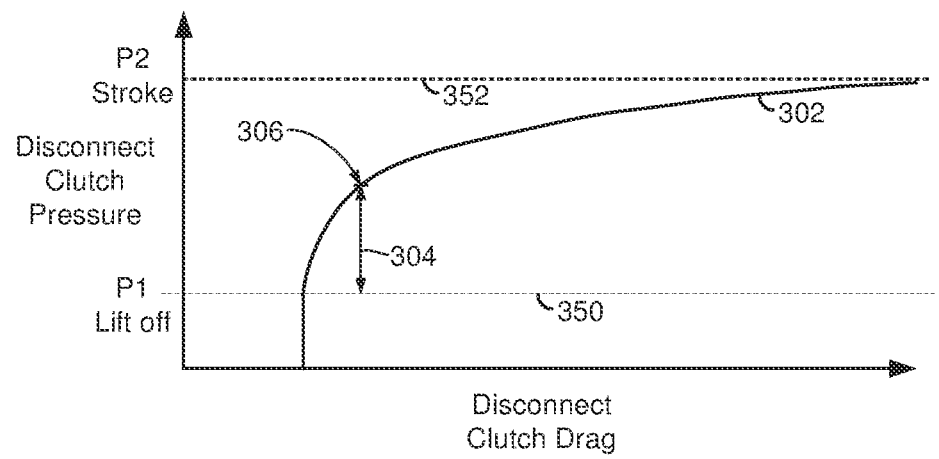
FIG. 3 shows a plot of a relationship between driveline disconnect clutch drag and driveline disconnect clutch pressure.
Figure 4A:
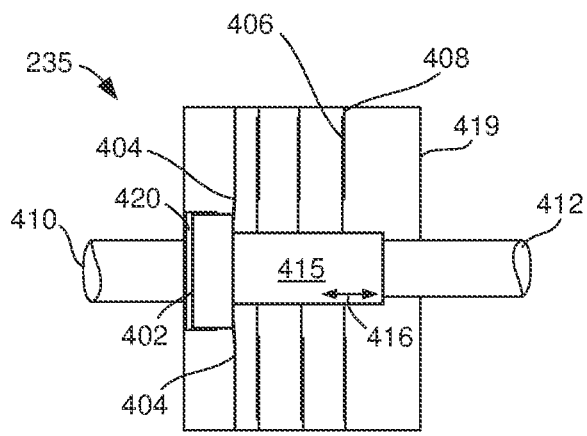
FIGS. 4A and 4B show schematic views of simplified driveline disconnect clutch operation.
Figure 4B:
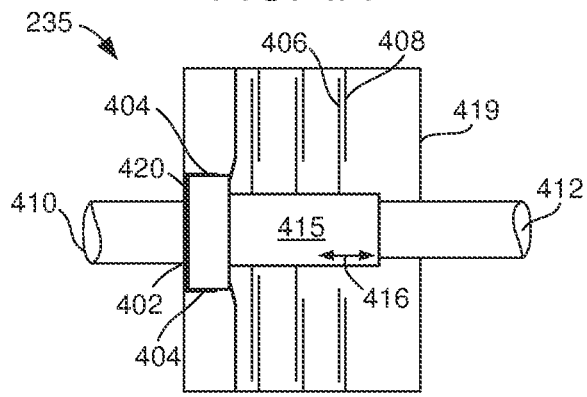
Figure 5:
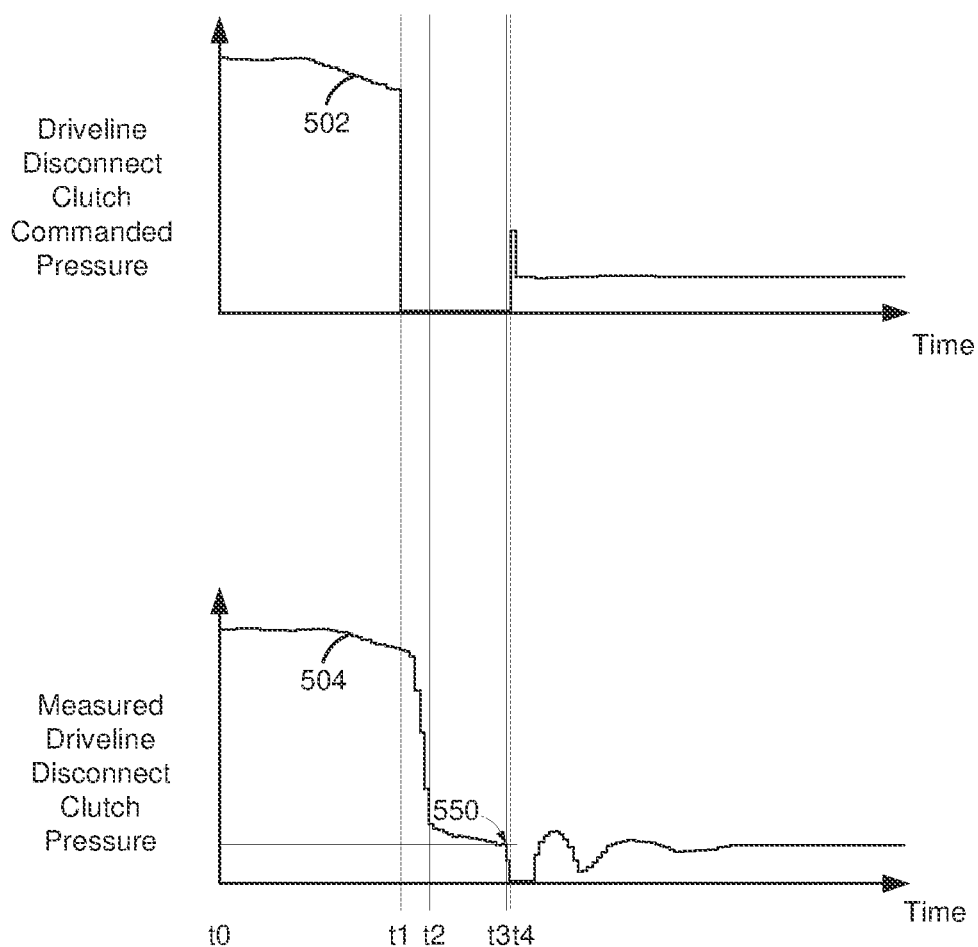
FIG. 5 shows plots of an example sequence during which driveline disconnect clutch liftoff pressure is determined.

The driveline disconnect clutch may be coupled to an engine of the type that is shown in FIG. 1. The engine may be included in a driveline as shown in FIG. 2. The driveline disconnect clutch may exhibit a drag/pressure relationship as shown in FIG. 3. The driveline disconnect clutch may be configured as shown in FIGS. 4A and 4B. A driveline disconnect clutch liftoff pressure may be determined via a sequence as shown in FIG. 5. The driveline disconnect clutch may be operated according to the method of FIG. 6.

Referring to FIG. 1, internal combustion engine 10, comprising a plurality of cylinders, one cylinder of which is shown in FIG. 1, is controlled by electronic controller 12 (e.g., an engine controller). Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Flywheel starter 96 (e.g., low voltage (operated with less than 30 volts) electric machine) includes pinion shaft 98 and pinion gear 95. Pinion shaft 98 may selectively advance pinion gear 95 to engage ring gear 99. Flywheel starter 96 may be directly mounted to the front of the engine or the rear of the engine. In some examples, flywheel starter 96 may selectively supply torque to crankshaft 40 via a belt or chain. In one example, flywheel starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electro-mechanical devices.

Fuel injector 66 is shown positioned to inject fuel directly into cylinder 34, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with engine air intake 42. Optional electronic throttle 62 adjusts a position of throttle plate 64 to control air flow from engine air intake 42 to intake manifold 44. In some examples, throttle 62 and throttle plate 64 may be positioned between intake valve 52 and intake manifold 44 such that throttle 62 is a port throttle. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. Temperature of catalytic converter 70 (e.g., catalyst) may be monitored via temperature sensor 72.

Controller 12 may receive input data from and provide output data to human/machine interface 160. Human/machine interface 160 may be a touch screen display, key board, or other known interface. Controller 12 may provide and display system status information via human/machine interface 160. A human user may input requests for powertrain and passenger cabin climate controls to human/machine interface 160.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an driver demand pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Driveline 200 is shown including vehicle system controller 255, controller 12, electric machine controller 252, transmission controller 254, energy storage device controller 253, and brake controller 250. The controllers may communicate over controller area network (CAN) 299. In addition, vehicle system controller 255 may communicate with communications system 256 (e.g., a transceiver) so that vehicle 225 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to controller 12, electric machine controller 252, transmission controller 254, and brake controller 250 to achieve driver input requests and other requests that are based on vehicle operating conditions.

For example, in response to a driver (human or autonomous) releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, controller 12, electric machine controller 252, transmission controller 254, and brake controller 250. Alternatively, the vehicle system controller 255 and the controller 12 may be a single unit while the electric machine controller 252, the transmission controller 254, and the brake controller 250 are standalone controllers.

In this example, driveline 200 may be powered by engine 10 and electric machine 240. In other examples, engine 10 may be omitted. Engine 10 may be started with an engine starting system shown in FIG. 1 or via electric machine 240 also known as an integrated starter/generator (ISG). Further, power of engine 10 may be adjusted via power actuator 204, such as a fuel injector, throttle, etc.

Driveline 200 is shown to include an electric energy storage device 262. Electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to higher voltage electric energy storage device 262. Low voltage bus 292 is electrically coupled to lower voltage electric energy storage device 263 and sensors/actuators/accessories 279. Sensors/actuators/accessories 279 may include but are not limited to front and rear windshield resistive heaters, vacuum pumps, climate control fans, and lights. Inverter 247 converts DC power to AC power and vice-versa to enable power to be transferred between electric machine 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid in line 248 that may be supplied to driveline disconnect clutch pressure control valve 281. A position of valve 281 may be modulated to control a pressure of fluid that is supplied to driveline disconnect clutch 235. The downstream or second side 234 of driveline disconnect clutch 236 is shown mechanically coupled to electric machine input shaft 237.

Electric machine 240 may be operated to provide power to driveline 200 or to convert powertrain power into electrical energy to be stored in electric energy storage device 262 in a regeneration mode. Electric machine 240 is in electrical communication with electric energy storage device 262. Electric machine 240 has a higher output power capacity than flywheel starter 96 shown in FIG. 1. Further, electric machine 240 directly drives driveline 200 or is directly driven by driveline 200. There are no belts, gears, or chains to couple electric machine 240 to driveline 200. Rather, electric machine 240 rotates at the same rate as driveline 200. Electric energy storage device 262 (e.g., high voltage battery or power source, which may be referred to as a traction battery) may be a battery, capacitor, or inductor. The downstream side of electric machine 240 is mechanically coupled to the torque converter impeller 285 of torque converter 206 via shaft 241. The upstream side of the electric machine 240 is mechanically coupled to the disconnect clutch 236. Electric machine 240 may provide a positive power or a negative power to driveline 200 via operating as a motor or generator as instructed by electric machine controller 252.

Torque converter 206 includes a torque converter turbine 286 to output power to input shaft 270. Input shaft 270 mechanically couples torque converter 206 to automatic transmission 208. Torque converter 206 also includes a torque converter lock-up clutch 212 (TCC). Power is directly transferred from torque converter impeller 285 to torque converter turbine 286 when the torque converter lock-up clutch is locked. The torque converter lock-up clutch is electrically operated by controller 254. Alternatively, the torque converter lock-up clutch may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of automatic transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter lock-up clutch 212 by adjusting the torque converter lock-up clutch in response to various engine operating conditions, or based on a driver-based engine operation request.

Torque converter 206 also includes pump 283 that pressurizes transmission fluid 295 to operate driveline disconnect clutch 236, forward clutch 210, and gear clutches 211. Pump 283 is driven via torque converter impeller 285, which rotates at a same speed as electric machine 240. In some examples, an electric transmission fluid pump 273 may also be provided to pressurize transmission fluid 295. The transmission fluid may be applied as a coolant to cool the electric machine 240 and apply/release driveline disconnect clutch 236. Line 248 (e.g., a conduit) may receive transmission fluid 295 from electric transmission fluid pump 273 and/or pump 283. Pressure in line 248 (e.g., line pressure) may be sensed via pressure sensor 249 and pressure in driveline disconnect clutch 236 may be sensed via pressure sensor 231.

Automatic transmission 208 includes gear clutches 211 (e.g., gears 1-10) and forward clutch 210 that may be actuated via transmission fluid 295. Automatic transmission 208 is a fixed ratio transmission. Alternatively, automatic transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216.

Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Parking pawl 296 may be engaged to prevent motion of output shaft 260 when automatic transmission 208 is in park. Transmission controller 254 selectively activates or engages torque converter lock-up clutch 212, gear clutches 211, and forward clutch 210. Transmission controller also selectively deactivates or disengages torque converter lock-up clutch 212, gear clutches 211, and forward clutch 210.

A frictional force may be applied to wheels 216 by engaging friction brakes 218. In one example, friction brakes 218 for wheels 216 may be engaged in response to a human driver pressing their foot on a brake pedal (not shown) and/or in response to instructions within brake controller 250. Further, brake controller 250 may apply friction brakes 218 in response to information and/or requests made by vehicle system controller 255. In the same way, a frictional force may be reduced to wheels 216 by disengaging friction brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the electric machine. Vehicle system controller 255 requests the engine power from controller 12 and the electric machine power from electric machine controller 252. If the electric machine power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter lock-up clutch 212 and engages gears via gear clutches 211 in response to shift schedules and torque converter lock-up clutch lockup schedules that may be based on input shaft power and vehicle speed. In some conditions when it may be desired to charge electric energy storage device 262, a charging power (e.g., a negative electric machine power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the electric machine 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears based on a unique shifting schedule to increase regeneration efficiency. Engine 10 and electric machine 240 may supply a negative power to transmission input shaft 270, but negative power provided by electric machine 240 and engine 10 may be limited by transmission controller 254 which outputs a transmission input shaft negative power limit (e.g., not to be exceeded threshold value). Further, negative power of electric machine 240 may be limited (e.g., constrained to less than a threshold negative threshold power) based on operating conditions of electric energy storage device 262, by vehicle system controller 255, or electric machine controller 252. Any portion of desired negative wheel power that may not be provided by electric machine 240 because of transmission or electric machine limits may be allocated to engine 10 and/or friction brakes 218 so that the desired wheel power is provided by a combination of negative power (e.g., power absorbed) via friction brakes 218, engine 10, and electric machine 240.

Accordingly, power control of the various powertrain components may be supervised by vehicle system controller 255 with local power control for the engine 10, automatic transmission 208, electric machine 240, and friction brakes 218 provided via controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from electric machine 240 by adjusting current flowing to and from rotor and/or armature windings of electric machine as is known in the art.

Transmission controller 254 receives transmission input shaft position via position sensor 271 and speed of electric machine 240 via position sensor 232. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, controller 12, and vehicle system controller 255, may also receive addition transmission information from sensors 277, which may include but are not limited to pump output line pressure sensors, transmission hydraulic pressure sensors (e.g., gear clutch fluid pressure sensors), a transmission fluid temperature sensor, electric machine temperature sensors, gear selector position sensors, and an ambient temperature sensor. Transmission controller 254 may also receive requested gear input from gear selector 290 (e.g., a human/machine interface device). Gear selector 290 may include positions for gears 1-N (where N is an upper gear number), D (drive), R (reverse), and P (park) as indicated at 293.

Brake controller 250 receives wheel speed information via wheel speed sensor 221 and braking requests from vehicle system controller 255. Brake controller 250 may also receive brake pedal position information from position sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative electric machine power does not cause the wheel power limit to be exceeded. For example, if controller 250 issues a negative wheel power limit of 50 N-m, electric machine power is adjusted to provide less than 50 N-m (e.g., 49 N-m) of negative power at the wheels, including accounting for transmission gearing.

Thus, the system of FIGS. 1 and 2 provides for a system, comprising: an internal combustion engine; an integrated starter/generator; a driveline disconnect clutch positioned in a driveline between the internal combustion engine and the integrated starter/generator; a transmission included in the driveline; and a controller including executable instructions stored in non-transitory memory that cause the controller to command a driveline disconnect clutch pressure in response to an estimate of a driveline disconnect clutch liftoff pressure, where the driveline disconnect clutch liftoff pressure is a pressure at which the driveline disconnect clutch drag begins to increase from a substantially constant value (e.g., a value that changes by less than ±3% of the drag reading). In a first example, the system includes where driveline disconnect clutch drag is internal forces within the driveline disconnect clutch that resist rotation of the driveline disconnect clutch when the driveline disconnect clutch is open. In a second example that may include the first example, the system includes where commanding the driveline disconnect clutch pressure includes adjusting the driveline disconnect clutch pressure to a stroke pressure. In a third example that may include one or both of the first and second examples, the system includes where the stroke pressure is a pressure where driveline disconnect clutch plates begin to touch each other. In a fourth example that may include one or more of the first through third examples, the system further comprises additional executable instructions that cause the controller to de-stroke the driveline disconnect clutch. In a fifth example that may include one or more of the first through fourth examples, the system further comprises additional executable instructions that cause the controller to generate the estimate of the driveline disconnect clutch liftoff pressure based on the driveline disconnect clutch pressure during de-stroking the driveline disconnect clutch. In a sixth example that may include one or more of the first through fourth examples, the system further comprises additional executable instructions that cause the controller to generate a derivative of the driveline disconnect clutch pressure. In a seventh example that may include one or more of the first through sixth examples, the system further comprises additional executable instructions that cause the controller to generate the estimate of the driveline disconnect clutch liftoff pressure in response to the derivative exceeding a threshold value.

Referring now to FIG. 3, a prophetic plot of a relationship between driveline disconnect clutch pressure and driveline disconnect clutch drag is shown. The vertical axis represents driveline disconnect clutch pressure and the driveline disconnect clutch pressure increases in the direction of the vertical axis arrow. The horizontal axis represents driveline disconnect clutch drag or resistance to motion (e.g., units of Newtons) and drag increases from the left side of the plot to the right side of the plot. Horizontal line 350 represents a driveline disconnect clutch lift off pressure and horizontal line 352 represents a driveline disconnect clutch stroke pressure (e.g., a pressure at which clutch plates begin to touch and torque capacity of the driveline disconnect clutch begins to increase from a value of zero). Trace 302 represents a relationship between driveline disconnect clutch pressure and driveline disconnect clutch drag.

It may be observed that the drag is a constant value at the liftoff pressure and the drag increases non-linearly as the driveline disconnect clutch pressure increases. The torque capacity of the driveline disconnect clutch (not shown) is zero beginning at zero pressure up to the stroke pressure. The drag reaches its maximum value at the stroke pressure.

Leader 304 represents an offset pressure from the liftoff pressure P1 at operating point 306. It should be recognized that as offset pressure increases, the driveline disconnect clutch drag increases. Therefore, if the driveline disconnect clutch pressure is adjusted to just below stroke pressure 352, the driveline disconnect clutch drag will be at a higher level so that driveline efficiency may be reduced. Conversely, if driveline disconnect clutch pressure is adjusted to just above the liftoff pressure, driveline disconnect clutch drag is reduced, but the driveline disconnect clutch piston has to travel further for the driveline disconnect clutch to fully close. Therefore, the driveline disconnect clutch may take longer to close if the driveline disconnect clutch is operated at a pressure that is just above the liftoff pressure.

Referring now to FIG. 4A, a cross section of a simplified driveline disconnect clutch 235 is shown. In this example, driveline disconnect clutch 235 is a normally open (e.g., the driveline disconnect clutch may transfer torque when the driveline disconnect clutch is actuated). Driveline disconnect clutch 235 is shown in an actuated state where it has capacity to transfer torque.

Driveline disconnect clutch 235 receives input from shaft 410 which is coupled to engine 10 and dual mass flywheel 215. Shaft 410 is coupled to sleeve 415 and sleeve 415 may slide axially as indicated by arrow 416. Clutch plates 406 are directly coupled to sleeve 415 and clutch plates 406 rotate in synchronism with sleeve 415. Clutch plates 406 are shown in contact with clutch plates 408. Clutch plates 408 may be in contact with clutch plates 406 when driveline disconnect clutch is in an actuated state. Piston 402 is shown in an extended position. Piston 402 may be extended to engage clutch plates 406 and plates 408 when oil is directed to gap 420 as shown. Sleeve 415 may rotate in synchronism with output shaft 412 when clutch plates 406 are in contact with clutch plates 408. Output shaft 412 is coupled to housing 419 and housing 419 is directly coupled to clutch plates 408.

Springs 404 apply a force to move piston 402 to a non-extended position when transmission fluid is removed from gap 420.

Referring now to FIG. 4B, a cross section of a simplified driveline disconnect clutch 235 is shown. In this figure, driveline disconnect clutch 235 is shown in an unactuated state where it has no capacity to transfer torque.

Gap 420 is shown with a reduced volume and springs 404 are shown applying force to piston 402 so that piston 402 is in a base position. In the base position, clutch plates 406 are not in contact with clutch plates 408 when oil is removed from gap 420 as shown. This allows driveline disconnect clutch 235 to decouple output shaft 412 from input shaft 410.

Turning now to FIG. 5, a de-stroke event where a liftoff pressure is determined is shown. The sequence that is shown in FIG. 5 may be provided via the system that is shown in FIGS. 1 and 2. The plots shown in FIG. 5 are time aligned.

The first plot from the top of FIG. 5 is a plot of a commanded driveline disconnect clutch pressure versus time. The vertical axis represents commanded driveline disconnect clutch pressure and commanded driveline disconnect clutch pressure increases in the direction of the vertical axis arrow. Time increases from the left side of the plot to the right side of the plot.

The second plot from the top of FIG. 5 is a plot of a driveline disconnect clutch pressure versus time. The vertical axis represents driveline disconnect clutch pressure and driveline disconnect clutch pressure increases in the direction of the vertical axis arrow. Time increases from the left side of the plot to the right side of the plot.

At time t0, the driveline disconnect clutch is fully closed and the commanded driveline disconnect clutch pressure is at a higher level. The driveline disconnect clutch pressure is also at a higher level.

At time t1, the driveline disconnect clutch is commanded fully open via reducing the commanded driveline disconnect clutch pressure to a value of zero. The driveline disconnect clutch pressure remains at a higher level, but it begins to decline shortly after time t1.

Between time t1 and time t2, the commanded driveline disconnect clutch pressure remains at zero and the driveline disconnect clutch pressure falls at a higher rate. The driveline disconnect clutch pressure drops as the driveline disconnect clutch returns to a fully open position.

At time t2, the commanded driveline disconnect clutch pressure remains zero and the rate of reduction in the driveline disconnect clutch enters a phase where the rate of change in the driveline disconnect clutch pressure is lower than during the time t1 to time t2 phase. The driveline disconnect clutch pressure is also below clutch stroke pressure.

At time t3, the commanded driveline disconnect clutch pressure remains zero and the rate of reduction in the driveline disconnect clutch remains at a lower level, but just after time t3 the driveline disconnect clutch pressure begins to drop at a higher rate a second time since time t0. The inventors have discovered that driveline disconnect clutch pressure with the characteristics shown at time t3 is a good estimate of driveline disconnect clutch liftoff pressure. In particular, a pressure below clutch stroke pressure and just before a second significant rate of pressure change after the commanded driveline disconnect clutch pressure is adjusted to zero or substantially zero, and before increasing the commanded driveline disconnect pressure, is a good estimate of driveline disconnect clutch liftoff pressure. For example, notice after time t1 and before time t2, the driveline disconnect clutch pressure rate of change declines at a first significant rate following the commanded reduction in driveline disconnect clutch pressure at time t1. The driveline disconnect clutch pressure rate of change declines at a less significant rate between time t2 and time t3. The driveline disconnect clutch pressure falls at a second significant rate after time t3 which is indicative of the clutch completing de-stroking. The driveline disconnect clutch pressure at time t3 is a good estimate of driveline disconnect clutch liftoff pressure because the clutch de-strokes completely upon reaching the liftoff pressure.

At time t4, the commanded driveline disconnect clutch pressure is increased so that the driveline disconnect clutch is prepositioned for a subsequent engine start or for closing the driveline disconnect clutch after the engine is started.

Figure 6:
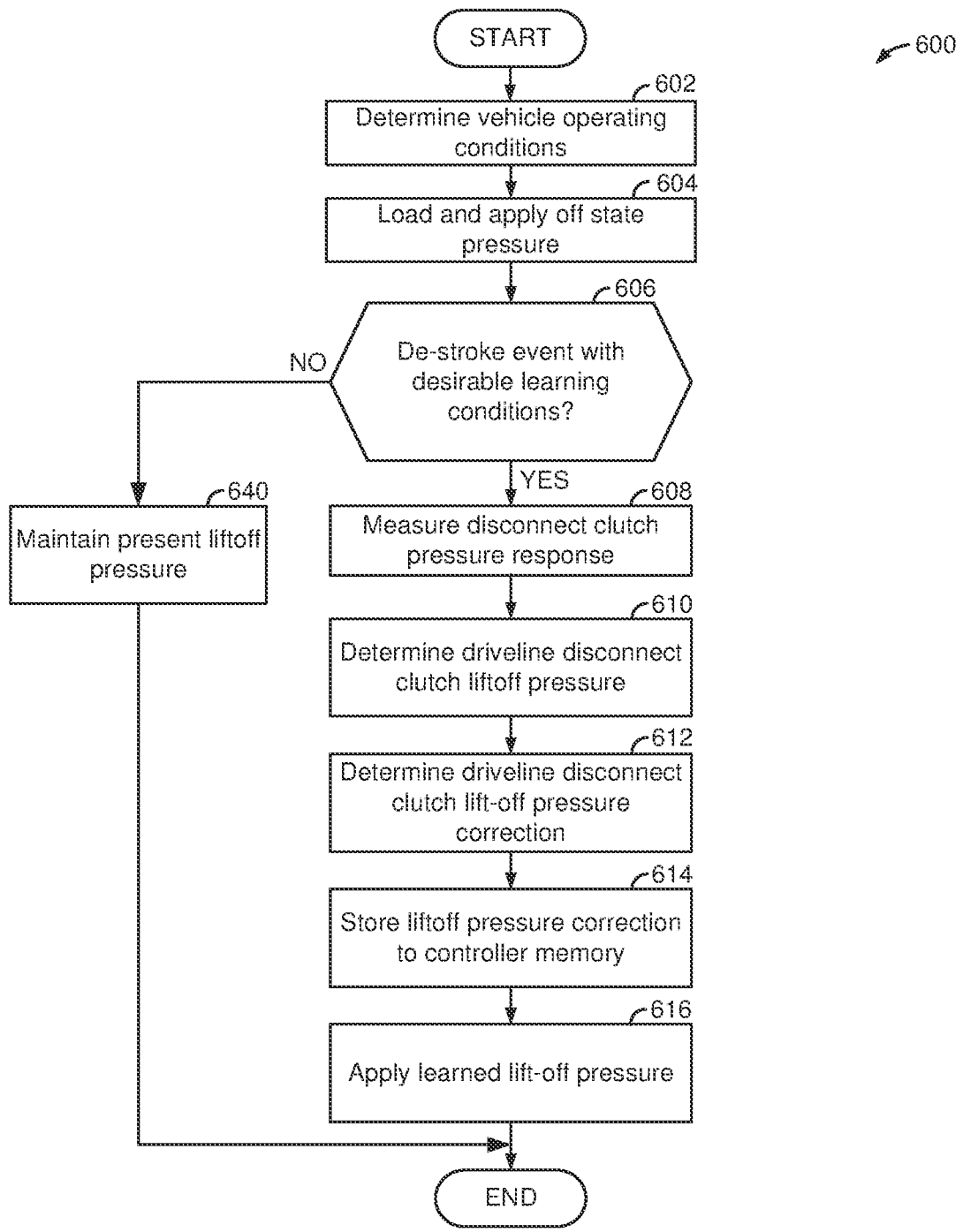
FIG. 6 shows a method for determining a driveline disconnect clutch liftoff pressure and operating a driveline disconnect clutch according to the driveline disconnect clutch liftoff pressure.

Referring now to FIG. 6, a method for operating an engine of a hybrid vehicle is shown. The method of FIG. 6 may be at least partially implemented as executable instructions stored in memory of one or more controllers in the system of FIGS. 1 and 2. Further, the method of FIG. 6 may include actions taken in the physical world by one or more controllers to transform an operating state of the system of FIGS. 1 and 2. Additionally, the method of FIG. 6 may provide the operating sequence shown in FIG. 5.

At 602, method 600 determines vehicle operating conditions. Vehicle operating conditions may include but are not limited to vehicle speed, driver demand torque or power, engine temperature, integrated starter/generator speed and torque, engine speed, transmission line pressure, driveline disconnect clutch pressure, and state of battery charge. Method 600 proceeds to 604.

At 604, method 600 loads into memory an offset pressure for the driveline disconnect clutch. The offset pressure is stored in controller memory and it may be indexed or referenced by transmission fluid temperature and torque converter impeller speed. Values of the offset that are stored in controller memory may be determined via monitoring driveline disconnect clutch drag while adjusting driveline disconnect clutch pressure. The offset values may be determined by taking a difference between a driveline disconnect clutch pressure and the driveline disconnect clutch liftoff pressure during conditions when the torque capacity of the driveline disconnect clutch is zero. Alternatively, the offset values may be determined by taking a difference between a driveline disconnect clutch pressure and the driveline disconnect clutch stroke pressure during conditions when the torque capacity of the driveline disconnect clutch is zero. Stored offset values may be compromises between clutch drag and time to close the driveline disconnect clutch from the offset position. Method 600 proceeds to 606 after determining the offset pressure.

At 606, method 600 judges whether or not a driveline disconnect clutch de-stroking event is occurring under operating conditions that may be conducive for learning a driveline disconnect clutch liftoff pressure. A de-stroking event may be characterized as the driveline disconnect clutch being commanded from a fully closed state (e.g., a higher driveline disconnect clutch pressure, such as 680 kPa) to a fully open state (e.g., a lower driveline disconnect clutch pressure, such as zero or less than 30 kPa). Operating conditions that are conducive for learning a driveline disconnect clutch liftoff pressure may include but are not limited to a transmission fluid temperature being within a predetermined range, battery state of charge being less than a threshold level, the driveline disconnect clutch not being degraded, and vehicle speed being less than a threshold speed. If method 600 judges that driveline disconnect clutch de-stroking event is occurring under operating conditions that are conducive for learning a driveline disconnect clutch liftoff pressure, the answer is yes and method 600 proceeds to 608. Otherwise, the answer is no and method 600 proceeds to 640.

At 640, method 600 maintains the present value for the driveline disconnect clutch liftoff pressure in controller memory. Method 600 proceeds to exit.

At 608, method 600 measures and/or senses driveline disconnect clutch pressure. Method 600 may measure and/or sense driveline disconnect clutch pressure at a predetermined sample rate (e.g., every 50 milliseconds) for a predetermined duration (e.g., until driveline disconnect clutch pressure is less than a threshold pressure and/or for a predetermined amount of time). Method 600 proceeds to 610.

At 610, method 600 determines a driveline disconnect clutch liftoff pressure from the measured or sensed driveline disconnect clutch pressure. In one example, method 600 may determine the liftoff pressure by determining a driveline disconnect clutch pressure immediately before the absolute value of the driveline disconnect clutch pressure rate of change (e.g., the derivative of driveline disconnect clutch pressure) exceeds a first threshold value a second time since the driveline disconnect clutch pressure was most recently commanded from a pressure where the driveline disconnect clutch pressure is fully closed to a pressure of zero or substantially zero (e.g., less than 40 kPa). The derivative may be approximated via the following equation:

$$Pder=(P2-P1)/(t2-t1)$$

where Pder is the derivative of the driveline disconnect clutch pressure, P2 is a second driveline disconnect clutch pressure, P1 is a first driveline disconnect clutch pressure, t2 is a time that the second driveline disconnect clutch pressure is determined, and t1 is a time that the first driveline disconnect clutch pressure is determined.

In addition, method 600 may require that the absolute value of the driveline disconnect clutch pressure rate of change be less than a second threshold amount or value for a threshold amount of time between the first time that the absolute value of the driveline disconnect clutch pressure rate of change exceeded the first threshold rate of change and the second time that the absolute pressure of the driveline disconnect clutch pressure rate of change exceeded the first threshold rate of change for the second time. FIG. 5 shows an example of the liftoff pressure being determined at point 550. Thus, the driveline disconnect clutch pressure that is selected as the driveline disconnect clutch liftoff pressure is based on when the absolute value of the derivative of the driveline disconnect clutch exceeds a threshold value. Method 600 proceeds to 612.

At 612, method 600 determines a driveline disconnect clutch liftoff pressure correction value. In one example, method 600 may determine a liftoff correction value via the following equation:

$$Liftcorr=p1 \cdot (Liftbase-Liftpress)$$

where Liftcorr is the driveline disconnect clutch liftoff pressure correction, p1 is a proportional value (e.g., a value that may range from 0 to 1), Liftbase is a base liftoff pressure for the driveline disconnect clutch that may be stored in controller memory at the time of vehicle manufacture, and Liftpress is the liftoff pressure that was determined at 610. Method 600 proceeds to 614.

At 614, method 600 stores the liftoff correction value to controller memory (e.g., random access memory) for use at a later time. Method 600 proceeds to 615.

At 615, method 600 applies the learned liftoff correction value. In one example, method 600 may adjust the driveline disconnect clutch to a preposition in preparation for a subsequent closing of the driveline disconnect clutch. The driveline disconnect clutch pressure may be adjusted to a preposition between a liftoff pressure and a stroke pressure (e.g., a pressure where the driveline disconnect clutch begins to transfer torque). In one example, method 600 may adjust the driveline disconnect clutch pressure command according to the following equation:

$$DDprescmd=Liftbase(TFT,IMPn)+Liftcorr+DDoffset(TFT,IMPn)$$

where DDprescmd is the driveline disconnect clutch pressure command, TFT is transmission fluid temperature, IMPn is torque converter impeller speed, Liftbase is a function or table that returns a driveline disconnect clutch liftoff pressure for a base driveline disconnect clutch liftoff position, Liftcorr is the liftoff pressure correction, and DDoffset is the driveline disconnect clutch offset from the driveline disconnect clutch offset pressure. Values in the function or table Liftbase may be determined via the procedure described at 610. Values in the function DDoffset may be determined via incrementally adjusting driveline disconnect clutch pressure while monitoring driveline disconnect clutch drag. The values that are input to the function or table DDoffset may be values that provide reduced drag levels and low clutch activation times. Method 600 may hold the driveline disconnect clutch at the preposition until driveline disconnect clutch closing is requested or until the vehicle is deactivated. If disconnect clutch closing is requested, method 600 may fully close the driveline disconnect clutch. Method 600 proceeds to exit.

In this way, a driveline disconnect clutch may be prepositioned based on a learned liftoff pressure. The learned liftoff pressure may reduce driveline disconnect clutch drag and the amount of time it takes to close the driveline disconnect clutch. Further, closing the driveline disconnect clutch from the learned liftoff pressure may make driveline disconnect clutch closing more repeatable.

The method of FIG. 6 provides for a method for operating a vehicle, comprising: via one or more controllers, during de-stroking of a driveline disconnect clutch, monitoring a driveline disconnect clutch pressure and generating an estimated driveline disconnect clutch liftoff pressure via the driveline disconnect clutch pressure; and adjusting a commanded driveline disconnect clutch pressure based on the estimated driveline disconnect clutch liftoff pressure. In a first example, the method includes where the de-stroking includes adjusting the commanded driveline disconnect clutch pressure to substantially zero pressure. In a second example that may include the first example, the method includes where the estimated driveline disconnect clutch liftoff pressure is based on the driveline disconnect clutch pressure. In a third example that may include one or both of the first and second examples, the method further comprises generating a derivative of the driveline disconnect clutch pressure. In a fourth example that may include one or more of the first through third examples, the method includes where the estimated driveline disconnect clutch liftoff pressure is based on the derivative. In a fifth example that may include one or more of the first through fourth examples, the method further comprises generating the estimated driveline disconnect clutch liftoff pressure according to the driveline disconnect clutch pressure after the derivative of the driveline disconnect clutch is less than a threshold value for longer than a threshold time duration. In a sixth example that may include one or more of the first through fifth examples, the method further comprises generating the estimated driveline disconnect clutch liftoff pressure according to the driveline disconnect clutch pressure when the derivative of the driveline disconnect clutch pressure exceeds a threshold value.

The method of FIG. 6 also provides for a method for operating a vehicle, comprising: via one or more controllers, during de-stroking of a driveline disconnect clutch, sensing a driveline disconnect clutch pressure and generating an estimated driveline disconnect clutch liftoff pressure via the driveline disconnect clutch pressure; adjusting a driveline disconnect clutch liftoff pressure correction in response to the estimated driveline disconnect clutch liftoff pressure; and adjusting a commanded driveline disconnect clutch pressure based on the driveline disconnect clutch liftoff pressure correction. In a first example, the method further comprises estimating the driveline disconnect clutch liftoff pressure based on a derivative of the driveline disconnect clutch pressure. In a second example, the method includes where the derivative exceeds a threshold value. In a third example, the method includes where de-stroking the driveline disconnect clutch includes de-stroking the driveline disconnect clutch from a fully closed state. In a fourth example, the method includes where the driveline disconnect clutch liftoff pressure correction is added to a baseline driveline disconnect clutch liftoff pressure.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
via one or more controllers, during de-stroking of a driveline disconnect clutch, monitoring a driveline disconnect clutch pressure and generating an estimated driveline disconnect clutch liftoff pressure via the driveline disconnect clutch pressure;
adjusting a commanded driveline disconnect clutch pressure based on the estimated driveline disconnect clutch liftoff pressure;
generating a derivative of the driveline disconnect clutch pressure; and
generating the estimated driveline disconnect clutch liftoff pressure according to the driveline disconnect clutch pressure after the derivative of the driveline disconnect clutch is less than a threshold value for longer than a threshold time duration.

2. The method of claim 1, where the de-stroking includes adjusting the commanded driveline disconnect clutch pressure to substantially zero pressure.

3. The method of claim 1, where the estimated driveline disconnect clutch liftoff pressure is based on the driveline disconnect clutch pressure.

4. The method of claim 1, where the estimated driveline disconnect clutch liftoff pressure is based on the derivative.

5. The method of claim 1, further comprising generating the estimated driveline disconnect clutch liftoff pressure according to the driveline disconnect clutch pressure when the derivative of the driveline disconnect clutch pressure exceeds the threshold value.

6. A system, comprising:
an internal combustion engine;
an integrated starter/generator;
a driveline disconnect clutch positioned in a driveline between the internal combustion engine and the integrated starter/generator;
a transmission included in the driveline; and
a controller including executable instructions stored in non-transitory memory that cause the controller to command a driveline disconnect clutch pressure in response to an estimate of a driveline disconnect clutch liftoff pressure, where the driveline disconnect clutch liftoff pressure is a pressure at which a driveline disconnect clutch drag begins to increase from a substantially constant value, additional executable instructions that cause the controller to generate a derivative of the driveline disconnect clutch pressure, and additional executable instructions that cause the controller to generate the estimate of the driveline disconnect clutch liftoff pressure in response to the derivative exceeding a threshold value.

7. The system of claim 6, where driveline disconnect clutch drag is internal forces within the driveline disconnect clutch that resist rotation of the driveline disconnect clutch when the driveline disconnect clutch is open.

8. The system of claim 6, where commanding the driveline disconnect clutch pressure includes adjusting the driveline disconnect clutch pressure to a stroke pressure.

9. The system of claim 8, where the stroke pressure is where driveline disconnect clutch plates begin to touch each other.

10. The system of claim 6, further comprising additional executable instructions that cause the controller to de-stroke the driveline disconnect clutch.

11. The system of claim 10, further comprising additional executable instructions that cause the controller to generate the estimate of the driveline disconnect clutch liftoff pressure based on the driveline disconnect clutch pressure during de-stroking the driveline disconnect clutch.

12. A method for operating a vehicle, comprising:
via one or more controllers, during de-stroking of a driveline disconnect clutch, sensing a driveline disconnect clutch pressure and generating an estimated driveline disconnect clutch liftoff pressure via the driveline disconnect clutch pressure;
adjusting a driveline disconnect clutch liftoff pressure correction in response to the estimated driveline disconnect clutch liftoff pressure, where the estimated driveline disconnect clutch liftoff pressure is based on a derivative of the driveline disconnect clutch pressure where the derivative exceeds a threshold value; and
adjusting a commanded driveline disconnect clutch pressure based on the driveline disconnect clutch liftoff pressure correction.

13. The method of claim 12, where de-stroking the driveline disconnect clutch includes de-stroking the driveline disconnect clutch from a fully closed state.

14. The method of claim 12, where the driveline disconnect clutch liftoff pressure correction is added to a baseline driveline disconnect clutch liftoff pressure.

\* \* \* \* \*